United States Patent
Noiri et al.

(10) Patent No.: US 6,873,394 B2
(45) Date of Patent: Mar. 29, 2005

(54) PRODUCING METHOD OF THE LIQUID CRYSTAL DISPLAY PANEL

(75) Inventors: Yoshikazu Noiri, Kagoshima (JP);
Toshihiro Horiuchi, Kagoshima (JP);
Toshiaki Mukai, Kagoshima (JP);
Shinji Ueebisu, Kagoshima (JP);
Hidefumi Yoshizoe, Kagoshima (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 54 days.

(21) Appl. No.: 10/636,412

(22) Filed: Aug. 7, 2003

(65) Prior Publication Data

US 2004/0027530 A1 Feb. 12, 2004

(30) Foreign Application Priority Data

Aug. 8, 2002 (JP) .......................... 2002-230970

(51) Int. Cl.[7] ............................................. G02F 1/1343
(52) U.S. Cl. ...................... 349/187; 349/189; 349/158
(58) Field of Search ................................. 349/188, 189, 349/190, 191, 187

(56) References Cited

FOREIGN PATENT DOCUMENTS

| JP | 60-166925 | 8/1985 |
|----|-----------|--------|
| JP | 7-064037 | 3/1995 |
| JP | 8-146372 | 6/1996 |
| JP | 2001-125056 | 5/2001 |

*Primary Examiner*—Kenneth Parker
*Assistant Examiner*—Phu Vu
(74) *Attorney, Agent, or Firm*—Katten Muchin Zavis Rosenman

(57) ABSTRACT

A producing method of a liquid crystal display panel includes steps (a) to (e). The Step (a) is fixing a counter substrate on a fixing table, wherein the counter substrate includes a plurality of counter portions each of which includes a plurality of counter electrodes. The Step (b) is dividing the counter substrate into the plurality of counter portions. The Step (c) is putting a liquid crystal material on the each of plurality of counter portions. The Step (d) is attaching a device substrate and the counter substrate together, wherein the device substrate includes a plurality of device portions each of which includes a plurality of switching devices. The Step (e) is dividing the device substrate into the plurality of device portions. The each of plurality of device portions is attached to a corresponding one of the each of plurality of counter portions.

20 Claims, 9 Drawing Sheets

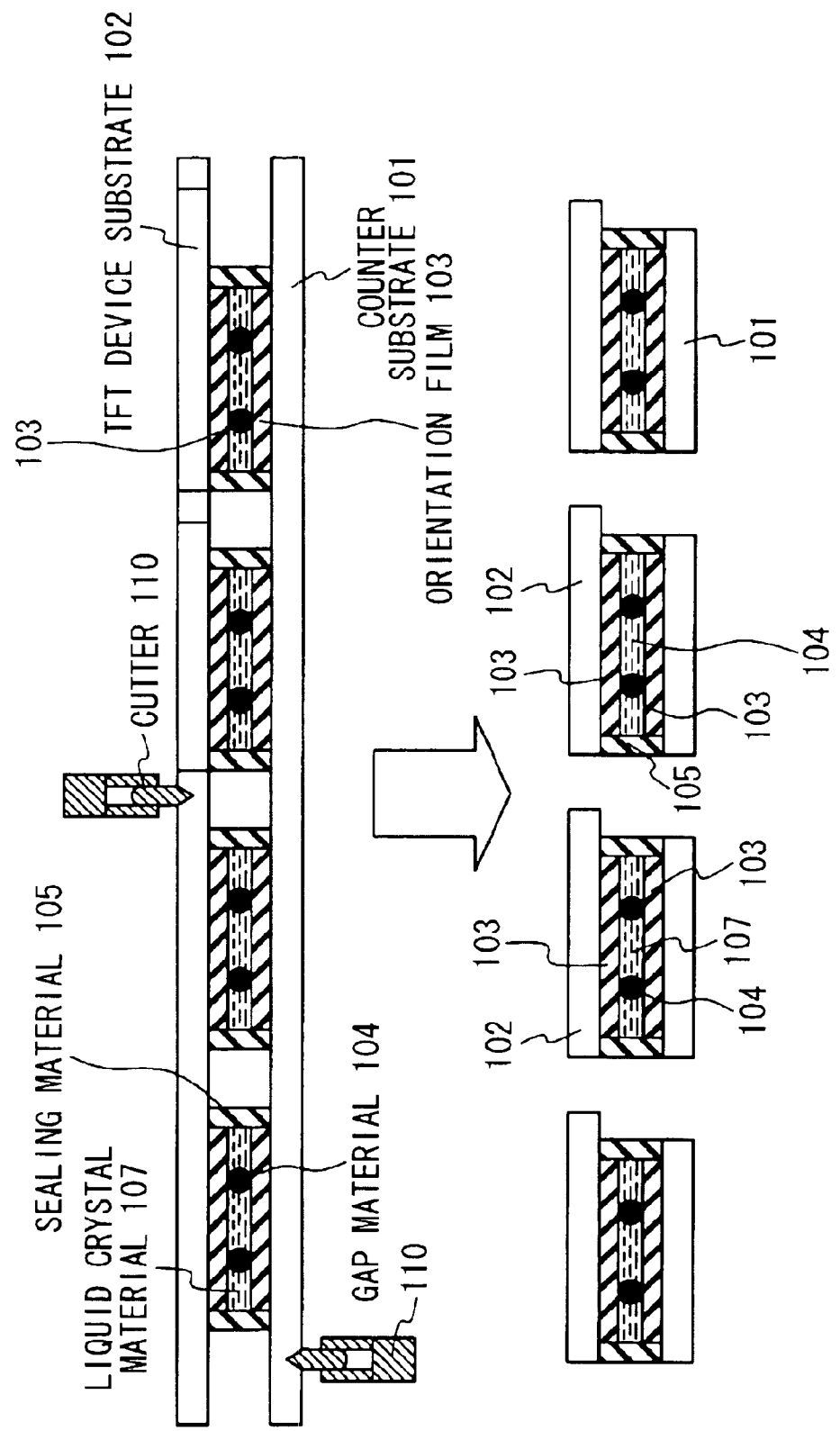

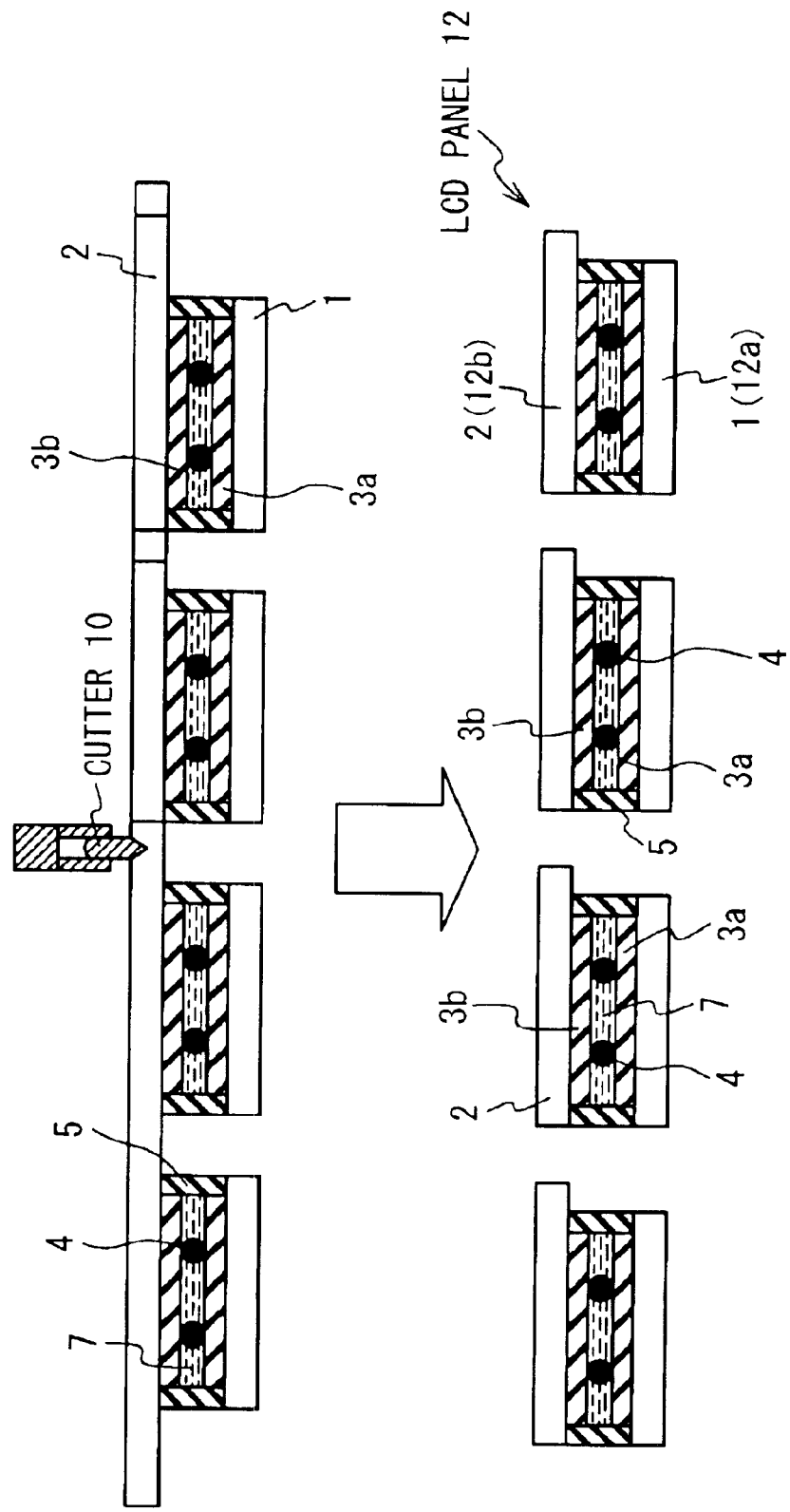

PRODUCING METHOD OF THE LIQUID CRYSTAL DISPLAY PANEL

BACKGROUND OF THE INVENTION

1. Field of the Invention

The present invention relates to a producing method of the liquid crystal display panel.

2. Description of the Related Art

Here, a finished product is called as a liquid crystal display device and a single part before setting a deflection plate is called a cell.

Conventionally, a liquid crystal display panel is produced by a following method: attaching a TFT device substrate to a counter substrate, dropping the liquid crystal material into a gap between these substrates, sealing a peripheral end of the gap with a sealing material, and then, cutting an assembly of the TFT device substrate and the counter substrate to obtain cells.

The conventional technique forming the cell will be described with reference to the Japanese Laid Open Patent Application (JP-A-Heisei 5-107517).

FIGS. 1A and 1B are plan views showing the conventional technique of the counter plates before and after being cut. As shown in FIG. 1A, the counter substrate 101 is formed by forming a transparent electrode (the illustration is omitted) and orientation films 103 looked like grids on a plastic film by this order. The areas in which the orientation films 103 are formed will be areas of the cells. Then, as shown in FIG. 1B, by cutting the parts of the counter substrate 101 (by the Thomson-type blanking blade), grooves 111 are formed on the counter substrate 101.

FIG. 2 is a sectional view showing the process to obtain cells by cutting both substrates.

In the same way, here, as for the TFT device substrate 102 which is formed by forming TFT devices on a glass plate or a plastic film, the orientation films like grids are formed and rubbing process is carried out.

Then, globular gap materials 104 are dispersed on the TFT device substrate. After that, sealing materials 105 is set at the peripheral of each area in which the orientation film 103 is formed.

Next, the liquid crystal materials 107 are dropped on the orientation films 103 of one of the TFT device substrate 102 and the counter substrate 101.

Moreover, the TFT device substrate is attached to the counter substrate 101 in the reduced pressure. Each of the orientation films 103 of the counter substrate 101 is faced to corresponding each of the orientation films 103 of the TFT device substrate 102, having the predetermined space. Then, the sealing material 105 is hardened. This situation is shown in the upper section of FIG. 2.

Then, the assembly of the TFT device substrate and the counter substrate 101 is cut down at the size of the cell to obtain the liquid crystal display panel. This situation is shown in the lower section of FIG. 2.

In the conventional producing method of the liquid crystal display panel, the process of cutting the counter substrate is carried out after attaching the counter substrate and the TFT device substrate. So, in this process, there are possibilities that the wirings of the TFT device substrate is damaged, the sealing materials receive the stress which causes damages, and strain or deviation occurs between substrates which also causes damages.

In the above described producing method of the liquid crystal display apparatus in the JP-A-Heisei 5-107517, the places in the counter substrate corresponding to the places in the TFT device substrate where electrodes are arranged are cut (first cutting) before attaching two substrates (FIG. 1B). Then, after attaching two substrates, remaining places in the counter substrate and in the TFT device substrate are cut (second cutting). Therefore, this method can prevent the electrodes in the TFT device substrate and the sealing materials in both substrates from being damaged.

However, in the places of the second cutting, there are still possibilities that the sealing materials receive the stress which causes damages, and strain or deviation occurs between substrates which also causes damages.

Especially, when using a glass substrate for forming the TFT device substrate and using a plastic for forming the counter substrate, it becomes easy for the stealing materials in the second cutting to be removed. That is, when using two materials of which linear expansion coefficients are largely different from each other, the possibility to start the destruction of the seal materials becomes high.

In conjunction with the above description, Japanese Laid Open Patent Application (JP-A-Showa 60-166925) discloses a manufacturing method of a liquid crystal display panel. The object is to provide the manufacturing method of a liquid crystal display panel which can easily form a part of electrodes in a flexible substrate.

The method is the manufacturing method of a liquid crystal display panel using the substrate which has flexibility. The liquid crystal display panel is assembled after cutting the place in the one electrode substrate to which the terminal part of the other electrode substrate is opposite.

Japanese Laid Open Patent Application (JP-A-Heisei 7-64037) discloses a manufacturing method of a flexible liquid crystal display panel. The object is to provide the manufacturing method of a plurality of flexible liquid crystal display panels fabricated from the large substrate formed by laminating plastic films by the process which is approximately same as a glass substrate on the hard substrate, maintaining high precision.

Maintaining a constant gap, the laminated substrate which is produced by laminating the first substrate and the second substrate each of which transparent electrodes face each other. Here, translucent plastic film is formed on the substrate. The first substrate and the second substrate have the transparent electrodes and a plurality of the first substrates and the second substrates can be extracted from the translucent plastic film. After that, the liquid crystal is poured into a liquid crystal inlet in a gap of the laminated substrate. After that, the laminated substrate is cut to a plurality of display panels on the substrate. The display panel is peeled from the substrate.

Japanese Laid Open Patent Application (JP-A-Heisei 8-146372) discloses a manufacturing method of a liquid crystal display apparatus. The object is to provide the producing method of the liquid crystal display which can produce a liquid crystal display by a continuous production.

The method has the following processes which are organized for the direction of the conveyance by this order. The first process forms a transparent electrode with fixed shape in the area forming liquid crystal displays of the plan of both insulation resin sheets, while conveying the first insulation resin sheet and the second insulation resin sheet respectively. Here, the first insulation resin sheet and the second insulation resin sheet have flexibility and have the length where the liquid crystal display can be arranged like a plurality of matrix. The second process forms orientation film with fixed shape in the area forming the liquid crystal displays of the plan of both insulation resin sheets. The third process forms a seal material in the area forming liquid crystal display of the plan of at least one of both insulation resin sheets. The fourth process includes followings. The components are formed of the liquid crystal display at both insulation resin sheets. After the printing of the seal material, both insulation resin sheets are pasted together through this seal material. A cut line is laid down shallower than the thickness of the insulation resin sheet. The insulation resin sheets are divided in order which was pasted together through this cut line.

Japanese Laid Open Patent Application (JP-A 2001-125056) discloses a manufacturing method of a liquid crystal display device. The object is to provide the producing method of the liquid crystal display device which can prevent the nonuniformity of retardation, the crack and the delamination in the carbonizing layer that occur to the liquid crystal display device, improve the quality and the reliability, never delaying by the removal of chip residue after cutting, improve cutting-off work efficiency to each liquid crystal display device and improve productivity remarkably.

The method has the following processes. The first process forms the display electrode position and the outside connection electrode position which consists of transparent electrode on one of the plastic film substrates. The second process forms the display electrode position which consists of transparent electrode on the other plastic film substrate and the connection electrode opposite position which is opposite to the outside connection electrode position. The third process carries out the orientation process to both plastic film substrates. The fourth process pastes two of those plastic film substrates together through the seal material. The fifth process cuts off the two of those plastic film substrates in strip-shape to expose a liquid crystal inlet. The sixth process pours liquid crystal into gap between both plastic film substrates through the liquid crystal inlet and seals the inlet. The seventh process cuts off the plastic film substrates every each liquid crystal display device. Before the above pasting, along the end side of the liquid crystal display device on the side of the display electrode portion in the connection electrode opposite portion which was formed in at least the other plastic film substrate, the notch is formed which is parallel to the long side of the outside connection pole part.

SUMMARY OF THE INVENTION

Therefore, an object of the present invention is to provide a producing method of a liquid crystal display panel which makes the production processes easy and efficient.

Another object of the present invention is to provide a producing method of a liquid crystal display panel which improves the yield of the production.

Still another object of the present invention is to provide a producing method of a liquid crystal display panel which can prevent from damaging wirings of a substrate, generating stress in sealing materials and generating strain and distortion between substrates.

In order to achieve an aspect of the present invention, the present invention provides a producing method of a liquid crystal display panel including: (a) fixing a counter substrate on a fixing table, wherein the counter substrate includes a plurality of counter portions each of which includes a plurality of counter electrodes; (b) dividing the counter substrate into the plurality of counter portions; (c) putting a liquid crystal material on the each of plurality of counter portions; (d) attaching a device substrate and the counter substrate together, wherein the device substrate includes a plurality of device portions each of which includes a plurality of switching devices; and (e) dividing the device substrate into the plurality of device portions. The each of plurality of device portions is attached to a corresponding one of the each of plurality of counter portions.

In the producing method of the present invention, the step (a) includes: (a1) setting the counter substrate through a spacer on a fixing table. The spacer is set on the fixing table and has a plurality of holes which penetrate the spacer. The fixing table absorbs the counter substrate through the spacer to fix the counter substrate.

In the producing method of the present invention, the step (b) includes: (b1) dividing the counter substrate into the plurality of counter portions by a blanking blade all at once.

In the producing method of the present invention, the fixing table has an air absorption groove. The spacer has a guide groove in which the blanking blade enters when dividing the counter substrate.

In the producing method of the present invention, the step (e) includes: (e1) cutting the device substrate from a side of the device substrate into the plurality of device portions.

In the producing method of the present invention, the counter substrate further includes: a plastic film. The device substrate further includes: any one of a plastic film and a glass plate.

In the producing method of the present invention, the step (d) includes: (d1) pasting a sealing material around the each of device portions, and (d2) pasting the each of device portions to a corresponding one of the each of counter portions by the sealing material.

In the producing method of the present invention, the step (c) includes: (c1) dropping the liquid crystal material on a plurality of positions in the each of counter portions. An amount of the liquid crystal material dropped is enough to fill a space which is formed among the sealing material, the each of device portions and the corresponding one of the each of counter portions.

In the producing method of the present invention, distances from the plurality of positions to a center point in the each of counter portions are substantially the same.

In the producing method of the present invention, the plurality of positions has substantially point symmetry to a center point in the each of counter portions.

In the producing method of the present invention, the step (d) includes: (d1) pasting a sealing material around the each of device portions, and (d2) pasting the each of device portions to a corresponding one of the each of counter portions by the sealing material.

In the producing method of the present invention, the step (c) includes: (c1) dropping the liquid crystal material on a plurality of positions in the each of counter portions. An amount of the liquid crystal material dropped is enough to fill a space which is formed among the sealing material, the each of device portions and the corresponding one of the each of counter portions.

In the producing method of the present invention, distances from the plurality of positions to a center point in the each of counter portions are substantially the same.

In the producing method of the present invention, the plurality of positions has substantially point symmetry to a center point in the each of counter portions.

In the producing method of the present invention, a plurality of cutting grooves are formed between at least two each of device portions in the device substrate such that dividing the device substrate in the step (e) is easier.

In order to achieve another aspect of the present invention, the present invention provides a method of a liquid crystal display panel including: (a) fixing a counter substrate on a fixing table, wherein the counter substrate includes a plurality of counter portions each of which includes a plurality of counter electrodes; (b) putting a liquid crystal material on the each of plurality of counter portions; (c) dividing the counter substrate into the plurality of counter portions; (d) attaching a device substrate and the counter substrate together, wherein the device substrate includes a plurality of device portions each of which includes a plurality of switching devices; and (e) dividing the device substrate into the plurality of device portions. The each of plurality of device portions is attached to a corresponding one of the each of plurality of counter portions.

In the producing method of the present invention, the counter substrate further includes: a plastic film. The device substrate further includes: any one of a plastic film and a glass plate.

In the producing method of the present invention, the step (a) includes: (a1) setting the counter substrate through a spacer on a fixing table. The spacer is set on the fixing table and has a plurality of holes which penetrate the spacer. The fixing table absorbs the counter substrate through the spacer to fix the counter substrate.

In the producing method of the present invention, the step (c) includes: (c1) dividing the counter substrate into the plurality of counter portions by a blanking blade all at once.

In the producing method of the present invention, the step (e) includes: (e1) cutting the device substrate from a side of the device substrate into the plurality of device portions.

BRIEF DESCRIPTION OF THE DRAWINGS

FIG. 2 is a sectional view showing the process to obtain cells by cutting both substrates;

FIG. 9 is a sectional view showing the process of cutting the TFT device substrate and taking out a plurality of liquid crystal display panels, which is shown in FIG. 7.

DESCRIPTION OF THE PREFERRED EMBODIMENT

An embodiment of the producing method of the liquid crystal display panel of the present invention will be described below with reference to the attached drawings.

Here, a finished product is called as a liquid crystal display panel (device) and a single part before setting a deflection plate is called a cell.

In the present invention, at least one of a TFT device substrate and a counter substrate of a liquid crystal display panel is formed from plastic film materials. In this case, the substrate becomes lightweight and moreover thin. Also, the counter substrate is cut down to a plurality of single parts for the cells. Next, a liquid crystal material is dropped onto the counter substrate by a drop filling (ODF:One Drop Fill) method. Then, the TFT device substrate after sealing up is cut down to a plurality of single parts for the cells. By this method, it can be easy and efficient to produce the cells in the high yield.

Figure 3:
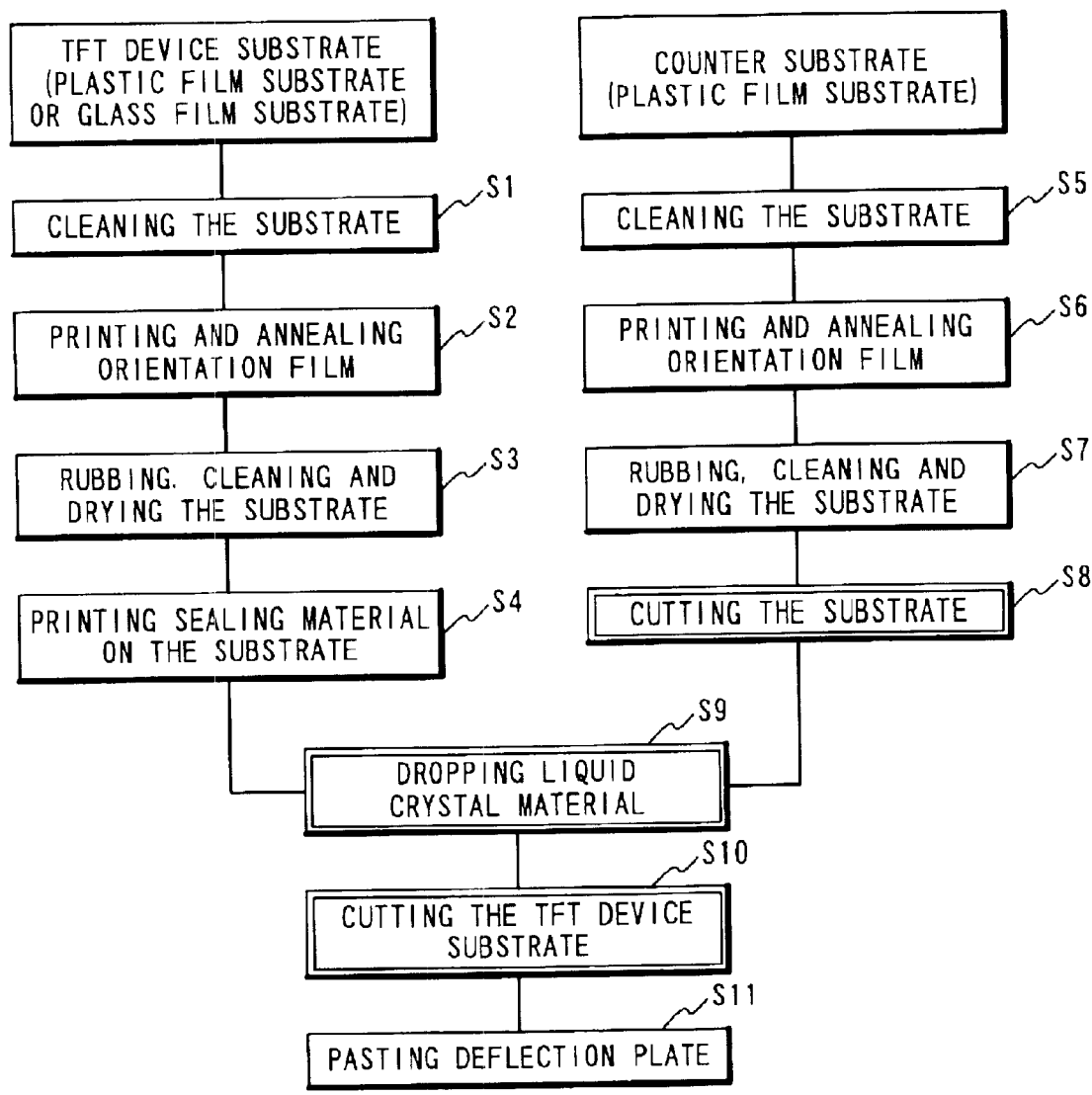
FIG. 3 is a view showing a flow chart of the embodiment of the producing method of the liquid crystal display panel of the present invention.

FIG. 3 is a view showing a flow chart of the embodiment of the producing method of the liquid crystal display panel of the present invention.

As shown in FIG. 3, in this embodiment, the liquid crystal display panel is manufactured by the drop filling (ODF) method of the liquid crystal material, having a plastic film substrate of at least one of the TFT device substrate and the counter substrate.

Especially, before the drop filling, the plastic film substrate of one of the TFT device substrate and the counter substrate is cut to a plurality of the single parts for the cells with the Thomson-type blanking blade. Therefore, it doesn't make damage or disconnection in terminals and moreover it prevents a seal material from stripping. Also, by controlling the number, the position which drops a liquid crystal material onto the substrate, the turn and deviation of the plastic film which was cut down to a plurality of the single parts for the cells can be restrained.

At first, the producing method of the TFT device substrate will be described in detail.

Firstly, a cleaning is carried out to a plastic film substrate or a glass substrate for a TFT device substrate (step S1). Then, after printing paste films which are precursors of orientation films on the substrate, the paste films are annealed so as to obtain the orientation films (step S2). Next, the rubbing is carried out to the TFT device substrate on which the orientation films are formed. After the rubbing, the substrate is cleaned and dried (step S3). Then, sealing materials are printed around the orientation films (step S4).

Next, the producing method of the counter substrate will be described in detail.

Firstly, a cleaning is carried out to a plastic film substrate for a counter device substrate (step S5). Then, after printing paste films which are precursors of orientation films on the substrate, the paste films are annealed so as to obtain the orientation films (step S6). Next, the rubbing is carried out to the counter substrate on which the orientation films are formed. After the rubbing, the substrate is cleaned and dried (step S7). Then, the substrate is cut and divided to a plurality of the single parts (step S8).

Next, after dropping a liquid crystal material onto the orientation film of the counter substrate, the TFT device substrate and the counter substrate are attached and pasted together such that the side having the sealing material and the side having the liquid crystal material are faced each other (step S9). After that, the TFT device substrate is cut and divided to a plurality of single parts for the cells (step S10). Finally, deflection plates are pasted to the plurality of single parts of the TFT device substrate. Also, deflection plates are pasted to the plurality of single parts of the counter substrate. The producing a liquid crystal display device (panel) is completed.

Incidentally, the order between step S8 and step S9 may be changed their order. Before the step S9, the part of the TFT device substrate may be formed grooves such that the TFT device substrate can be easily cut at the step S10.

In short, this embodiment is characterized is that the counter substrate is cut to single parts with the necessary size before attaching and pasting the plastic film substrate (the counter substrate) together to the glass or the plastic film substrate (the TFT device substrate) by the drop filling (ODF) method.

In this way, by cutting the counter substrate before attaching and pasting the counter substrate together to the TFT device substrate, the wiring in the TFT device substrate is not damaged. Also, the sealing material after hardening does not receive any stress or strain and is prevented from the stripping and the damaging.

Figure 1A:
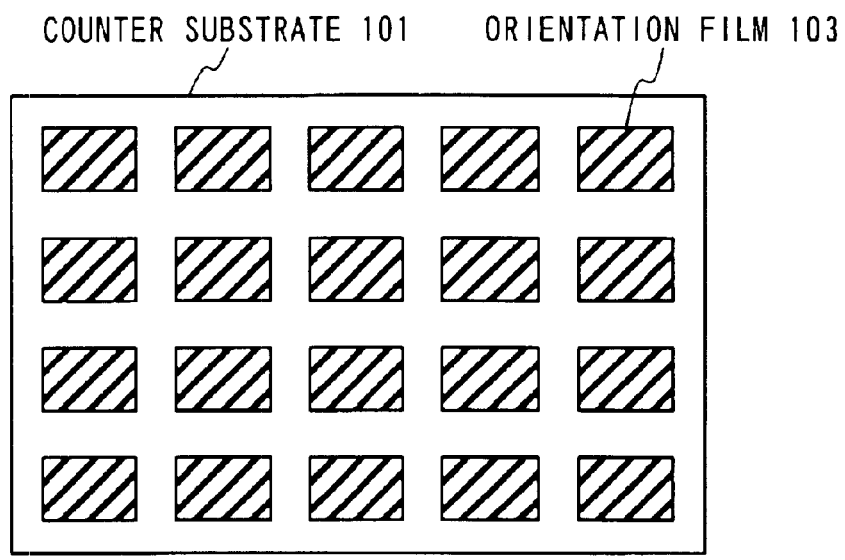
FIGS. 1A and 1B are plan views showing the conventional technique of the counter plates before and after being cut.
Figure 1B:
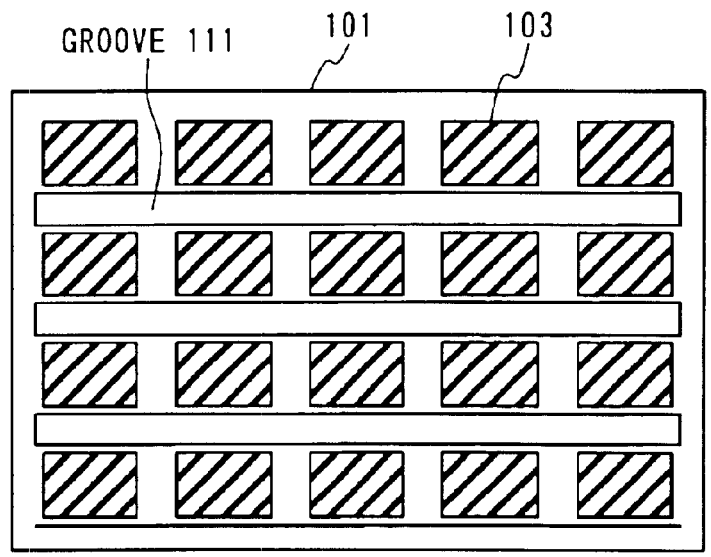
Figure 4A:
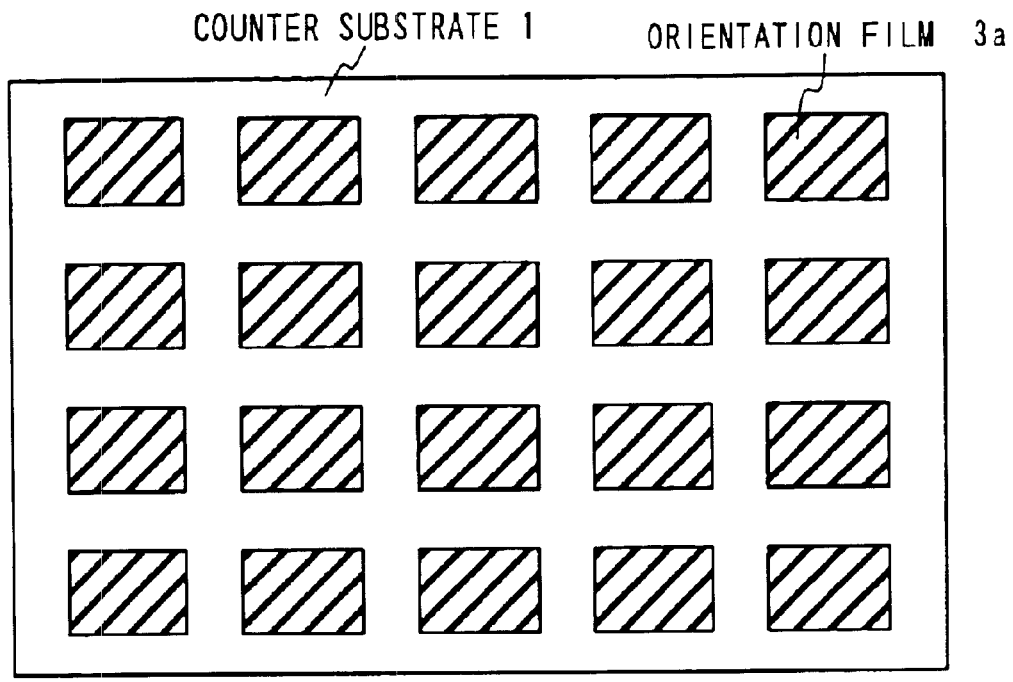
FIG. 4A is a plan view showing the counter substrate described in FIG. 1.
Figure 4B:
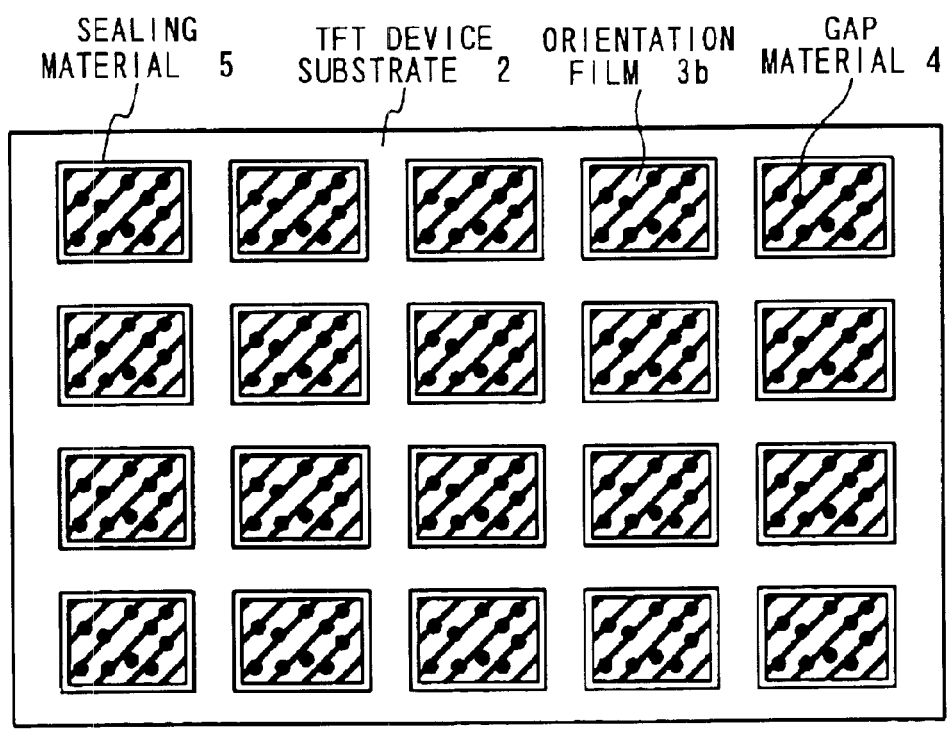
FIGS. 4B is a plan view showing the TFT device substrate described in FIG. 1.

FIG. 4A is a plan view showing the counter substrate described in FIG. 1. FIG. 4B is a plan view showing the TFT device substrate described in FIG. 1.

As shown in FIG. 4A, the counter substrate 1 has the orientation films 3a printed in matrix, to which the rubbing process is carried out after printed. The plastic film forming the counter substrate 1 is made of at least one of plastic materials selected from amorphous thermoplastic resins such as polycarbonate, polyallylate, polyestersulfone and cyclic amorphous polyolefine, and thermosetting resins such as polyfunctional acrylate, polyfunctional polyolefine, unsaturated polyester and epoxy resin.

Also, the thickness of the plastic film is less than 400 μm. In this embodiment, the thickness of 100–200 μm is more desirable.

Next, as shown in FIG. 4B, the TFT device substrate 2, which is formed from the plastic film or the glass film, has the orientation films 3b printed in matrix, to which the rubbing process is carried out after printed. In the TFT device substrate 2, the globular gap materials 4 are dispersed on the orientation film 3b. Then, the sealing materials 5 are arranged around the orientation films 3b of the TFT device substrate 2. Incidentally, when the TFT device substrate 2 is formed from the plastic film, same plastic materials used for the counter substrate 1 described above with same thickness can be used for the TFT device substrate 2

Figure 5:
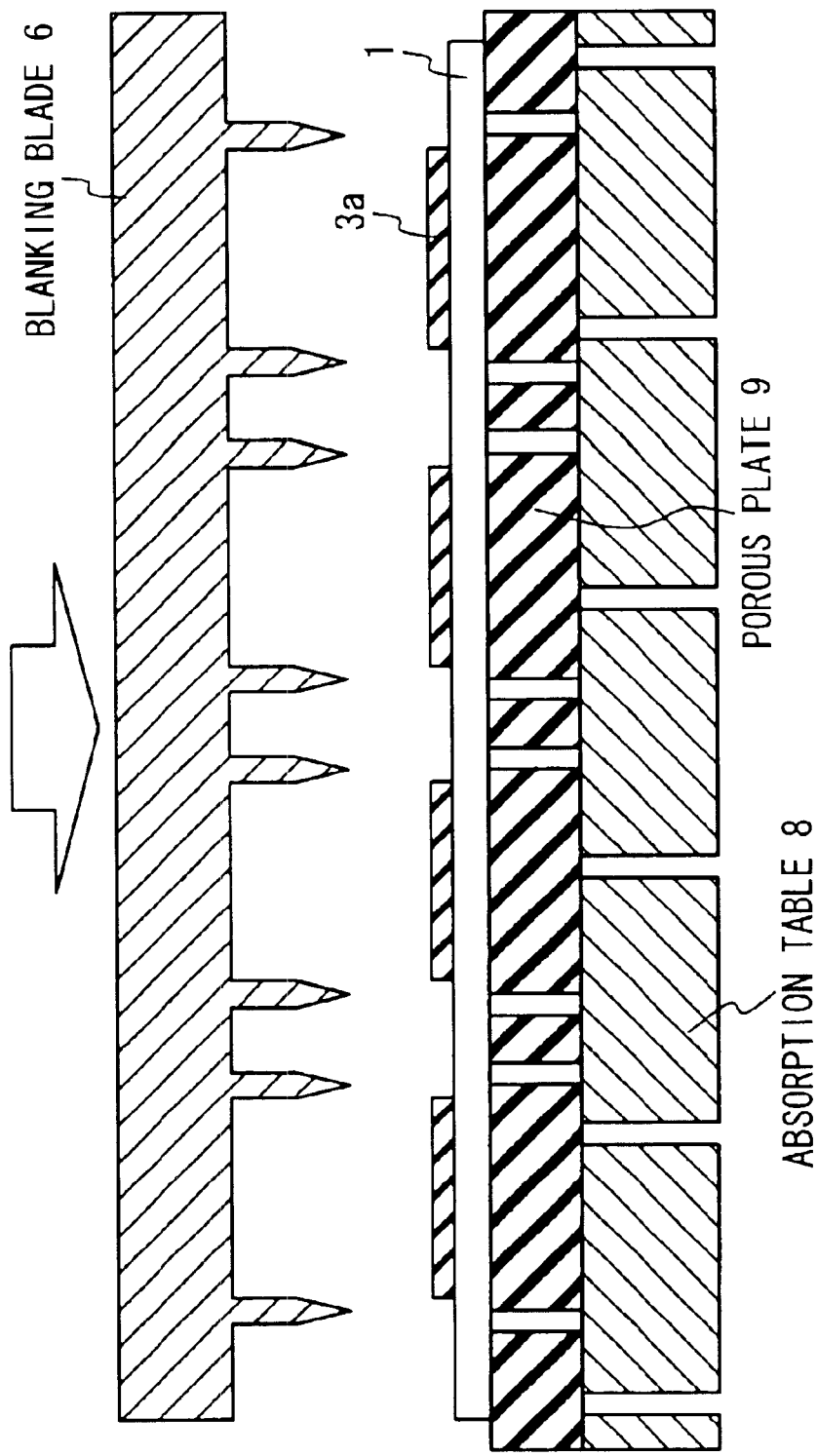
FIG. 5 is a sectional view showing a situation when cutting the counter substrate which is shown in FIG. 4A with the Thomson-type blanking blade.

FIG. 5 is a sectional view showing a situation when cutting the counter substrate which is shown in FIG. 4A with the Thomson-type blanking blade.

Firstly, as shown in FIG. 5, when the counter substrate 1 is cut to a plurality of single parts at step S8 in FIG. 3, the counter substrate 1 is set on a porous plate 9 on an absorption table 8. Here, the absorption table 8 has air vacuum grooves, which can absorbs the substance (here, the porous plate 9) on the absorption table 8. The porous plate 9 has guide holes such that the porous plate 9 can absorbs the substance (here, the counter substrate 1). The porous plate 9 can also prevent the absorption table 8 from damaging by the Thomson-type blanking blade 6. The porous plate 9 can also prevent the counter substrate 1 from the deviation occurring.

Next, the counter substrate 1 is absorbed on the absorption stage such that the orientation films 3a of the counter substrate 1 turn upward. Here, the absorption stage is composed of the absorption table 8 and the porous plate 9 formed from resin mat or ceramic plate.

Then, by pushing down the Thomson-type blanking blade 6 toward the counter substrate 1, the counter substrate 1 is cut down to the plurality of single parts with necessary size. In this case, the counter substrate 1 is not partially cut to remain the whole shape. The counter substrate 1 is completely cut down to obtain each single part.

In this way, cutting the counter substrate 1 by using the Thomson-type blanking blade makes cutting planes smooth and clean. It does not generate any burr at the cutting planes of the counter substrate 1. Therefore, the sealing materials 5 are not damaged by the cutting planes when attaching and pasting the counter substrate 1 and the TFT device substrate 2 together.

Also, by using the porous plate 9, the counter substrate 1 is absorbed uniformly at the whole bottom surface. Therefore, the bending, the distortion and the deviation before and after cutting of the counter substrate 1 can be prevented.

Figure 6:
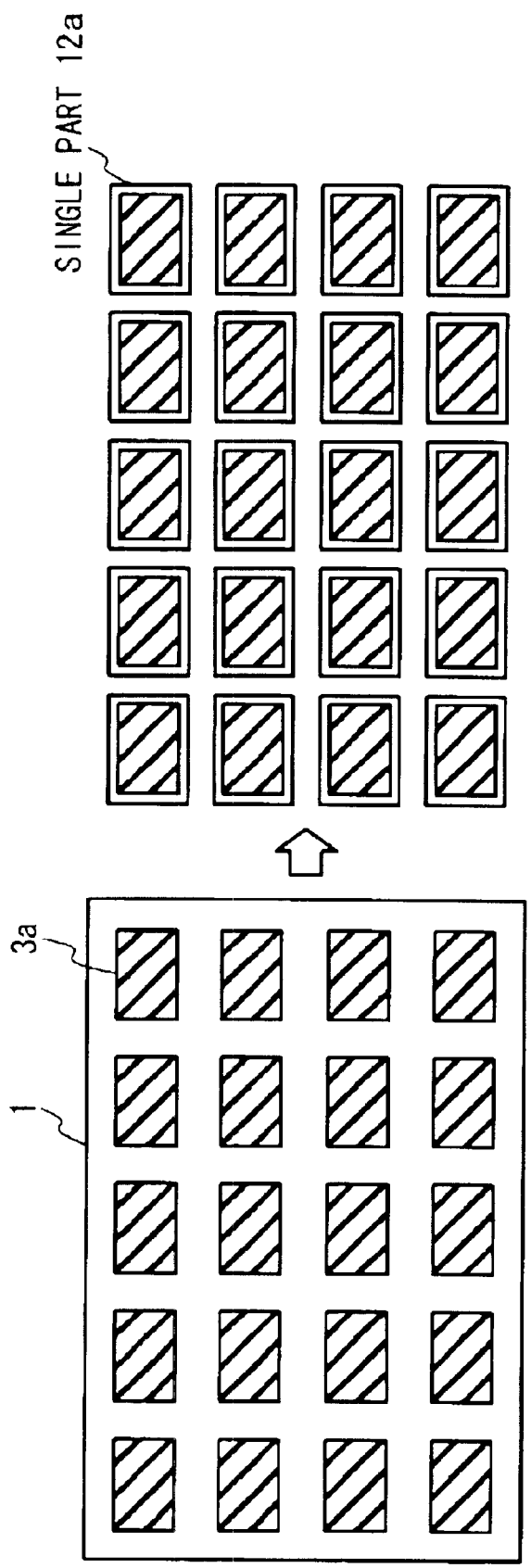
FIG. 6 is a plan view showing the situation when cutting the counter substrate shown in FIG. 5.

The situation of the counter substrate 1 is shown in FIG. 6. FIG. 6 is a plan view showing the situation when cutting the counter substrate shown in FIG. 5. The counter substrate 1 is cut to the plurality of the single parts 12a. Also, the single part 12a which was cut down from the counter substrate 1 is cut for the area slightly larger than that of the orientation film 3a. The area left around orientation film 3a of the single part 12a is used for the space where the sealing materials, which are formed on the side of the TFT device substrate, are pasted.

Figure 7:
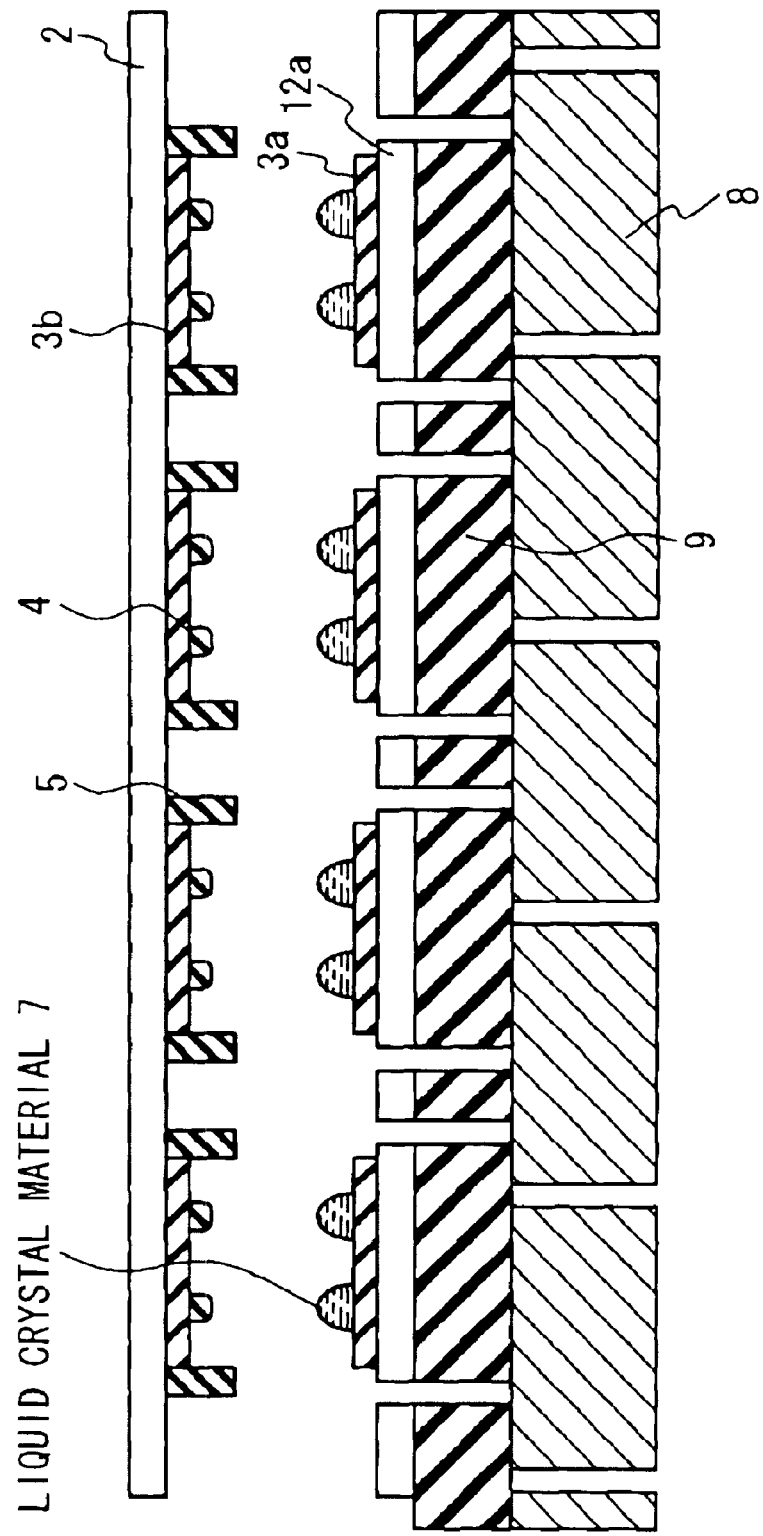
FIG. 7 is a sectional view showing a process that the counter substrate and the TFT device substrate are attached together after the liquid crystal is dropped on the orientation film of the counter substrate 1 of FIG. 6.

FIG. 7 is a sectional view showing a process that the counter substrate and the TFT device substrate are attached together after the liquid crystal is dropped on the orientation film 3a of the counter substrate 1 of FIG. 6. As shown in FIG. 7, when attaching and pasting together the counter substrate 1 and the TFT device substrate 2 in the step S9, the liquid crystal material 7 is dropped on the orientation film 3a of the single part 12a of the cut counter substrate 1 (shown in FIGS. 5 and 6). The number of drops of the liquid crystal material 7 is equal to or more than two. The positions of the drops which have the center-symmetry in the single part 12a are desirable. Because by the surface tension of the liquid crystal material 7 when the TFT device substrate 2 is contacted to the liquid crystal material 7, the single part 12a of the counter substrate 1 can be prevented from the turn and the distortion.

On the other hand, as shown in above-mentioned FIG. 4B, the gap materials 4 are dispersed onto the orientation films 3b of the TFT device substrate 2, and the sealing materials 5 are formed around the orientation film 3b of the TFT device substrate 2.

At least one of the cold setting type material, the thermosetting type material and the UV hardening type material is applied to the sealing material 5 pasted on the TFT device substrate 2 by using the dispenser or the screen print apparatus.

Also, the gap materials 4 may be formed in the shape of cylinder solid by using the technique of the exposure and the development of the photosensitive resin film when producing the TFT devices. In this case, it is not necessary to disperse the globular gap materials 4 on the TFT device substrate 2.

Next, the TFT device substrate 2 is attached and pasted together to the single parts 12a of the counter substrate 1 on the porous plate 9 in the vacuum atmosphere. Then, the sealing materials 5 are hardened by heating or irradiating the UV light.

Figure 8A:
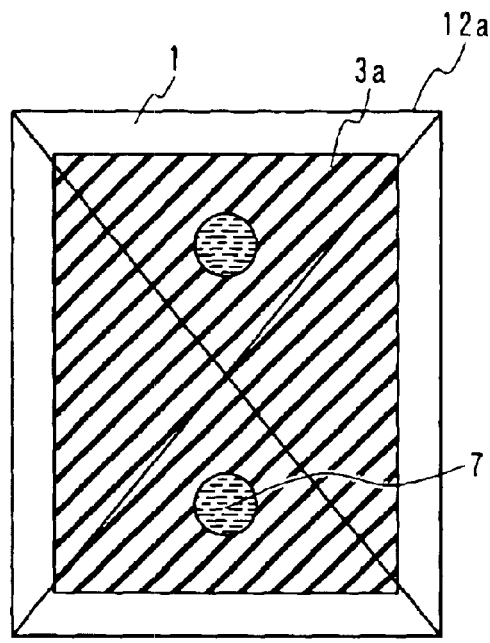
FIGS. 8A and 8B are plan views showing the drop positions of the liquid crystal materials 7 on the orientation films of the single parts shown in FIG. 7, respectively.
Figure 8B:
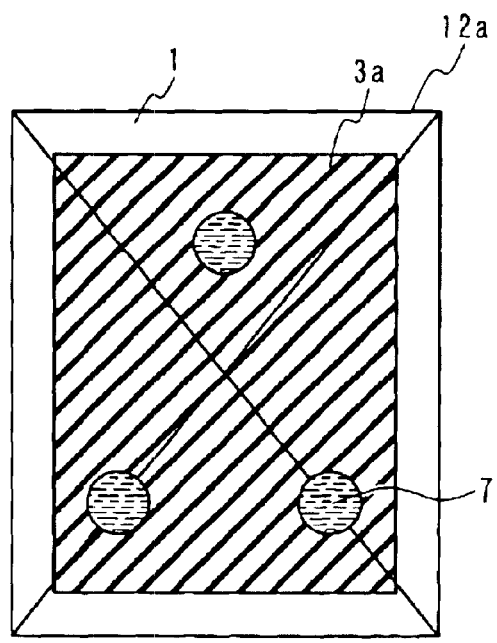

FIGS. 8A and 8B are plan views showing the drop positions of the liquid crystal materials 7 on the orientation films 3a of the single parts 12a shown in FIG. 7, respectively.

The case shown in FIG. 8A is one example which drops the liquid crystal materials 7 in the two symmetrical positions to the central point on the orientation film 3a of the counter substrate 1.

The case shown in FIG. 8B is another example which drops the liquid crystal materials 7 in the three positions which are same distances from the central point on the orientation film 3a of the counter substrate 1.

In this embodiment, the number of drops of the liquid crystal materials 7 is equal to or more than two. Also, the positions where the liquid crystal materials 7 are dropped are the symmetrical positions or the equal distance positions to the central point. By this method, because the turning forces which are generated by the surface tensions of the liquid crystal materials 7 and is applied to the counter substrate 1 are balanced, the counter substrate 1 can be prevented from the rotation and the distortion.

FIG. 9 is a sectional view showing the process of cutting the TFT device substrate and taking out a plurality of liquid crystal display panels, which is shown in FIG. 7. When cutting the TFT device substrate 2 in the step S10 of FIG. 3, first, the sealing materials 5 are pasted around the orientation films 3b of the TFT device substrate 2. Then, after attaching the TFT device substrate 2 and the counter substrate together, the sealing materials 5 are hardened. After that, the TFT device substrate 2 is cut with a cutter 10 to a plurality of single parts 12b with a liquid crystal display panel size. The single part 12b and the single part 12a compose a liquid crystal display panel 12.

This embodiment is brought out more advantage when the counter substrate 1 is formed from a plastic substrate and the TFT device substrate 2 is formed from a glass substrate. Also, this embodiment is more effective when the number of the cells cut down from one counter substrate 1 and one TFT device substrate 2 is larger.

Various modifications to the above embodiment may be carried out in the present invention. For example, the combination of the substrates to paste together may use substrates with the same linear thermal expansion coefficient and may make substrates of the different materials.

Also, the TFT device substrate may use an active matrix device substrate. Moreover, it may make a TFT device substrate with the color filter which put the pigments of RGB onto the TFT device (color filter on TFT:CF ON TFT).

As described above, in the producing method of the liquid crystal display panel of the present invention, the counter substrate is cut completely to the single part before attaching together the TFT device substrate and the counter substrate formed both from plastic films. Also, the counter substrate 1 formed from a plastic film is not cut on the TFT device substrate. Therefore, the wiring in the TFT device substrate is not damaged. Also, the sealing material after hardening does not receive any stress or strain and is prevented from the stripping and the damaging.

In the present invention, cutting the counter substrate by using the Thomson-type blanking blade makes cutting planes smooth and clean. It does not generate any burr at the cutting planes of the counter substrate. Therefore, the sealing materials are not damaged by the cutting planes when attaching and pasting the counter substrate and the TFT device substrate together.

Also, In the present invention, since the counter substrate is absorbed through a porous material on the absorption table, the whole bottom surface of the counter substrate is absorbed uniformly. Therefore, the bending, the distortion and the deviation before and after cutting of the counter substrate can be prevented.

In the present invention, the number of drops of the liquid crystal materials is equal to or more than two. Also, the positions where the liquid crystal materials are dropped are the symmetrical positions or the equal distance positions to the central point. By this method, because the turning forces which are generated by the surface tensions of the liquid crystal materials and is applied to the counter substrate are balanced, the counter substrate can be prevented from the rotation and the distortion.

In the present invention, the cutting the counter substrate is carried out at one batch and the liquid crystal materials are dropped on the orientation films of the counter substrate by using the ODF method. Therefore, in case that the counter substrate is formed from a plastic substrate and the TFT device substrate is formed from a glass substrate, and the number of the cells cut down from one counter substrate and one TFT device substrate is larger, the present invention is more effective.

What is claimed is:

1. A producing method for a liquid crystal display panel comprising:
    (a) fixing a counter substrate on a fixing table, wherein said counter substrate includes a plurality of counter portions each of which includes a plurality of counter electrodes.
    (b) dividing said counter substrate into said plurality of counter portions;
    (c) putting a liquid crystal material on each of said divided plurality of counter portions.
    (d) attaching a device substrate and said counter substrate together, wherein said device portions each of which includes a plurality of switching devices; and
    (e) dividing said device substrate into said plurality of device portion wherein said each of plurality of device portions is attached to a corresponding one of said each of plurality of counter portions.

2. The producing method of a liquid crystal display panel according to claim 1, wherein said step (a) comprises:
    (a1) setting said counter substrate through a spacer on said fixing table,
    said spacer is set on said fixing table and has a plurality of holes which penetrate said spacer, and
    said fixing table absorbs said counter substrate through said spacer to fix said counter substrate.

3. The producing method of a liquid crystal display panel according to claim 2, wherein said step (b) comprises:
    (b1) dividing said counter substrate into said plurality of counter portions by a blanking blade all at once.

4. The producing method of a liquid crystal display panel according to claim 3, wherein said fixing table has an air absorption groove, and
    said spacer has a guide groove in which said blanking blade enters when dividing said counter substrate.

5. The producing method of a liquid crystal display panel according to claim 1, wherein said step (e) comprises:
    (e1) cutting said device substrate from a side of said device substrate into said plurality of device portions.

6. The producing method of a liquid crystal display panel according to claim 1, wherein said counter substrate further includes: a plastic film, and
    said device substrate further includes: any one of a plastic film and a glass plate.

7. The producing method of a liquid crystal display panel according to claim 1, wherein said step (d) comprises:
    (d1) pasting a sealing material around said each of device portions, and
    (d2) pasting said each of device portions to a corresponding one of said each of counter portions by said sealing material.

8. The producing method of a liquid crystal display panel according to claim 7, wherein said step (c) comprise:

(c1) dropping said liquid crystal material on a plurality of positions in said each of counter portions, an amount of said liquid crystal material dropped is enough to fill a space which is formed among said sealing material, said each of device portions and said corresponding one of said each of counter portions.

9. The producing method of a liquid crystal display panel according to claim 8, wherein distances from said plurality of positions to a center point in said each of counter portions are substantially the same.

10. The producing method of a liquid crystal display panel according to claim 8, wherein said plurality of positions have substantially point symmetry to a center point in said each of counter portions.

11. The producing method of a liquid crystal display panel according to claim 2, wherein said step (d) comprises:

(d1) pasting a sealing material around said each of device portions, and (d2) pasting said each of device portions to a corresponding one of said each of counter portions by said sealing material.

12. The producing method of a liquid crystal display panel according to claim 11, wherein said step (c) comprise:

(c1) dropping said liquid crystal material on a plurality of positions in said each of counter portions, an amount of said liquid crystal material dropped is enough to fill a space which is formed among said sealing material, said each of device portions and said corresponding one of said each of counter portions.

13. The producing method of a liquid crystal display panel according to claim 12, wherein distances from said plurality of positions to a center point in said each of counter portions are substantially the same.

14. The producing method of a liquid crystal display panel according to claim 12, wherein said plurality of positions have substantially point symmetry to a center point in said each of counter portions.

15. The producing method of a liquid crystal display panel according to claim 1, wherein a plurality of cutting grooves are formed between at least two each of device portions in said device substrate such that dividing said device substrate in said step (e) is easier.

16. A producing method for a liquid crystal display panel comprising:

(a) fixing a counter substrate on a fixing table, wherein said counter substrate includes a plurality of counter portions each of which includes a plurality of counter electrodes.

(b) putting a liquid crystal material on said each of plurality of counter portions (c) dividing said counter substrate into said plurality of counter portions following step B and prior to steps D and E;

(d) attaching a device substrate and said counter substrate together, wherein said device portions each of which includes a plurality of switching devices; and (e) dividing said device substrate into said plurality of device portion wherein said each of plurality of device portions is attached to a corresponding one of said each of plurality of counter portions.

17. The The producing method of a liquid crystal display panel according to claim 16, wherein said counter substrate further includes: a plastic film, and said device substrate further includes: any one of a plastic film and a glass plate.

18. The producing method of a liquid crystal display panel according to claim 17, wherein said step (a) comprises:

(a1) setting said counter substrate through a spacer on said fixing table, said spacer is set on said fixing table and has a plurality of holes which penetrate said spacer, and said fixing table absorbs said counter substrate through said spacer to fix said counter substrate.

19. The producing method of a liquid crystal display panel according to claim 18, wherein said step (c) comprises:

(c1) dividing said counter substrate into said plurality of counter portions by a blanking blade all at once.

20. The producing method of a liquid crystal display panel according to claim 19, wherein said step (e) comprises:

(e1) cutting said device substrate from a side of said device substrate into said plurality of device portions.

* * * * *